Patented Nov. 20, 1951

2,576,066

UNITED STATES PATENT OFFICE 2,576,066

PROTEIN PURIFICATION PROCESS AND PROTEINACEOUS PRODUCT

Archie Lee Caldwell, Indianapolis, Ind., assignor to Eli Lilly and Company, Indianapolis, Ind., a corporation of Indiana No Drawing. Application August 11, 1948,
Serial No. 43,781

6 Claims. (Cl. 195—29)

This invention relates to the purification of crude protein materials and to the preparation of purified products therefrom, especially to the purification of gland residues and to the preparation therefrom of a palatable dietary supplement.

Many unrefined animal and vegetable substances contain useful and desirable proteins but are at present used only for animal food or are discarded because they are unpalatable, due to their unpleasant or even nauseating odor and taste, and to the persistence of such bad odor and taste despite refinement by available purification procedures. Among these materials are fish cuttings, liver residues, pancreas residues, and the like. These materials commonly contain proteins capable of furnishing all of the essential amino acids in a well balanced ratio, but the odoriferous and unpalatable substances present have heretofore prevented their utilization for human consumption.

Among such protein materials, which have an especially valuable and well balanced protein content but which are now substantially waste products, are certain gland residues such as "liver residue" and "pancreas residue" which are produced in large quantities in the pharmaceutical industry as the residue from the production of various liver extracts and of insulin. Such production generally involves recovery of the water-soluble therapeutically active materials of the glands, and leaves as the gland residue the water-insoluble material, consisting largely of the valuable proteins originally present and having the same valuable nutritious properties as in the untreated glands. These residues, even when dry, have a particularly disagreeable odor and taste, and have found little application heretofore. They are usually disposed of as fertilizer or animal food, or even discarded as useless.

It has been found to be important in contemporary medicine to supply convalescent patients and others with large amounts of protein. However, the obtaining of the required protein from increased amounts of normal food has been found to be difficult and impractical because of the large bulk required. With suitable purification, the crude protein-containing materials referred to above will provide a source of concentrated protein to supply large amounts of readily assimilable protein, in small bulk.

It is a primary object of my invention to provide a purification process which will effectively remove the odoriferous and bad tasting fractions from crude protein material, without substantial destruction of the protein itself, and thus to provide purified protein materials which may be either used as such or further treated to prepare protein derivatives. Another object of my invention is to provide a purified and utilizable protein concentrate, suitable for human food and for therapeutic purposes, and to prepare such a concentrate from crude protein materials which are commonly regarded as waste material or suitable only for animal consumption. It is a particular object of my invention to prepare palatable protein concentrates from liver residue and pancreas residue. It is another object of this invention to provide a protein concentrate which will supply all of the essential amino acids and will in itself be sufficient to maintain nitrogen balance in man. A further object of my invention is to provide a readily assimilable protein concentrate suitable for therapeutic use in conditions where a concentrated diet is of value. Further objects will become apparent from the disclosures made herein.

In accordance with the above and other objects I have now discovered a process whereby it is possible to so treat crude protein materials as substantially to remove disagreeable odor, taste, and flavor without substantial destruction of desired protein, and to obtain thereby a protein product which is palatable and suitable in every way for human consumption, and which when consumed is easily assimulated by the body and will maintain nitrogen balance, and from which product improved protein derivatives may be prepared. The process of my invention comprises a controlled, enzymatic partial digestion of the crude protein material with peptic or other proteolytic enzymes, followed by thorough washings, as with water and with a fat solvent, to remove soluble contaminants, and recovery of the washed residue, desirably in dry state.

By the practice of my invention, the undesirable taste and odor of the crude protein material is removed or destroyed and a purified and concentrated protein product is obtained, and such product is in a readily assimilable form wholly acceptable for human consumption. It may now be used as human food, and especially to provide supplemental protein in diets where small bulk with high food value is required, or may be employed as an intermediate in the production of protein derivatives, such as amino acid mixtures.

My purification process yields a protein product in which the essential amino acids are preserved as constituents of the protein. For this reason among others, it is of special value for the recovery of components for the human diet from crude protein material such as gland residues and fish cuttings. The proteins of such materials contain as constituents all of the essential amino acids in desirable proportions for human use, and the products obtained therefrom in accordance with my invention consist of such proteins containing as constituents all the essential amino acids in desirable proportions.

My protein concentrate will furnish all of the essential amino acids, so that human beings may be maintained in positive nitrogen balance with it as the sole source of nitrogen. The product has been found to be readily administered and wholly acceptable and well tolerated when given as a dietary supplement to patients with debilitating disease, without untoward effects such as the nausea and diarrhea which are encountered with the usual amino acid mixtures, and the patients regularly gained weight, whereas on other diets there was weight loss. For a dietary supplement, my purified protein may be combined with other food components, for example with minerals, and may be so combined in proportions to provide a protein-mineral food which will completely satisfy requirements for both proteins and minerals.

In accordance with my invention, ground or chopped or otherwise finely-divided protein material is suspended in water in a suitable container, a proteolytic enzyme is added, in an amount insufficient for complete digestion, and the mixture is subjected to controlled digestion conditions. The conditions of digestion are controlled to produce a low grade of enzymatic activity at a relatively slow rate, sufficient to produce the desired effect in a period which is short enough to avoid putrefaction, desirably not over about 20 hours, and the digestion is terminated before there occurs any substantial digestion and destruction of the protein itself. When the digestion has reached the desired point (determined as set forth below), the digestion is terminated, and the insoluble material is recovered.

The digestion may be terminated by heating, but usually it is convenient to proceed directly to the further purifying and recovery steps, which effectively stop the digestion. To this end, the digestion mixture is filtered and the filter cake or residue is then suspended in water and thoroughly mixed, to obtain effective washing, and is again filtered. The filtrate is discarded, and the solid residue is recovered. When the product is to be used as such, and especially when the material is not previously defatted, the solid residue is then thoroughly washed with a water-dissolving fat solvent such as alcohol, acetone, ether, and the like, as by being mixed successively with and separated from several portions of the solvent, and is then filtered. The final washed material is now freed of any solvent which imparts taste or odor, and is preferably dried and powdered.

The powder so obtained is light brown in color and contains about 14 percent total nitrogen and less than about one percent of amino nitrogen, and consists of at least about 80 percent, and usually 90 percent or more of protein.

Preferably, the crude protein I use is a gland residue, especially liver residue and pancreas residue, remaining after therapeutic principles have been extracted therefrom. However, other crude protein materials, such as fresh liver, fish protein material, etc., may be used in my process.

The proteolytic enzyme used may be pepsin or trypsin or combinations thereof, or enzymes isolated from nonpathogenic molds and bacteria, or the proteolytic enzymes contained in certain fresh glands of animals, such as pork or beef pancreas or the pyloric caecal mass of certain fish, notably the tuna.

The duration of the digestion and the activity of the enzymes are so adjusted that only a very small part of the crude material is rendered soluble in water or alcohol. Only so much of the crude material is digested as will solubilize substantially all of the nauseant, malodorous, and unpleasant tasting components of the material, and the digestion is limited to avoid substantial destruction of the desired protein and to avoid protein degradation products such as amino acids. Digestion is effected at a relatively low grade of enzymatic activity, which gives this desired action under ready control and permits maximum yield; but should be sufficiently rapid to minimize putrefaction. This result may be obtained by various combinations of the controlling conditions, i. e., the amount and kind of enzyme used, the pH of the mixture, the temperature, the time of digestion, etc., and is preferably obtained by using an amount of enzyme which is substantially suboptimal—substantially less than the optimum amount for complete digestion—and by carrying out the digestion under substantially suboptimal conditions for the amount of enzyme present, with the digestion sufficiently active to reach the desired point within a time which substantially avoids putrefaction. For efficient use of enzyme and effective control with high yield, the enzyme is desirably used in an amount at least about and not greatly in excess of 15 to 20 percent of that which under optimum conditions would completely digest the protein material, and the digestion is carried out at about pH 5, and under these conditions the digestion can be carried out at room temperature—about 20° to 30° C.—and the extent of digestion limited by controlling the time of digestion, usually to a period of about 12 to 15 hours. Preferably, the digestion is controlled to reach the desired point in a period of from about 4 to not over about 20 hours.

Digestion sufficient for the desired purification usually solubilizes only a small portion of the crude starting material—in the range of not over about 10 per cent, and for high yields even less, say 1 to 3 percent, of the starting material. The sufficiency of the digestion may be determined with reference to the choline content of the materials (when they contain choline), for I find that choline is representative of the undesirable impurities and that when substantially all of the choline, say 80 to 90 percent, is removed, a satisfactory product is obtained in good yield. For example, in treating liver residue that assays about 15–16 mg. of choline per gram of solid material, I have found that the water used to wash the digested material will assay about 35–40 mg. of choline per gram of dissolved solids, the alcohol used to wash the water-washed material will assay about 60 mg. of choline per gram of dissolved solids, and the finished product will assay only about 2 mg. or less of choline per gram. (Choline assays were made by the method of R. W. Engel, J. Biol. Chem. 144, 701, 1942.) Alternatively, and in any case where choline is not present as such in substantial amounts in the starting material, the sufficiency of digestion may be determined empirically, by taking periodic samples of the digestion mixture, washing them thoroughly with the process solvents, drying sufficiently to remove the odor and taste of the solvent, and then observing the odor and taste of the dry material.

The following examples illustrate my invention.

Example 1

One hundred gallons of water are mixed in a suitable container with 600 pounds of wet liver residue which comprises about 65 percent water and about 35 percent solids containing 67 percent of protein. The mixture is stirred, the temperature adjusted to 25° to 30° C., and one ounce of pepsin 1:6000, i. e. a pepsin of such activity that it will completely digest 6000 times its own weight of freshly coagulated egg albumin, dissolved in one pint of warm water, is added. This amount of the enzyme is about 20 percent of the amount required for complete digestion under optimum conditions. The acidity of the aqueous liver residue mixture is generally approximately pH 5 and may be left at this point or, if necessary, adjusted to about this point, as with hydrochloric acid or sodium carbonate. The mixture is allowed to digest for 12 hours, with occasional stirring, and is then filtered. The filter cake or residue is then placed in a pot and 100 gallons of warm water added, and the whole is thoroughly mixed. The water-extraction mixture is then filtered. The solid residue is added to a tank containing 170 gallons of alcohol, and mixed thoroughly, as by stirring for 15 to 30 minutes, and the mixture is then allowed to settle and the supernatant alcohol is decanted. The residue is washed twice with 85 gallon portions of alcohol, and is then filtered, and the residue is dried. The dried material is the desired product, and is obtained as a light brown powder, in a yield of about 65 percent based on the total solids content of the liver residue, and about 97 percent based on the actual protein content of such solids.

The powdered solid product thus obtained is odorless and has so little or no taste, and any taste is of such bland, noncharacteristic and nonpersistent nature, that it can be considered tasteless. It is insoluble in water and in alcohol. Assays of material so prepared show 14.46 percent total nitrogen and 0.25 percent amino nitrogen, which is equivalent to 90.5 percent protein. It may be ground to any desired degree of fineness. As thus prepared, it may be used directly in the diet, with or without added flavoring, or it may be combined with carbohydrates, minerals, or vitamins, or mixtures thereof, and such preparations may be supplied in granular form or compressed into tablets.

Analysis for the essential amino acid constituents of the protein of a product prepared from liver residue in accordance with this example shows the following percentages, based on the total weight of the product.

| | Percent |
|---|---|
| Arginine | 4.50 |
| Histidine | 2.36 |
| Isoleucine | 6.24 |
| Leucine | 8.0 |
| Lysine | 6.20 |
| Methionine | 2.30 |
| Phenylalanine | 5.0 |
| Threonine | 4.20 |
| Tryptophane | 0.21 |
| Valine | 5.30 |

The protein concentrate prepared as set forth above may be administered as a dietary supplement in combination with carbohydrates and minerals, in a mixture which satisfies requirements both for proteins and for minerals. The substantial absence of taste and odor of the protein concentrate permits great freedom in the preparation and flavoring of such combinations. By way of example, a combination product having the flavor and taste of milk chocolate, and which is found on test to be palatable and acceptable in ample quantities to produce improvement and weight gain in patients suffering from debilitating disease, is made as follows:

The following materials are placed in a pot mill: sodium iodide, 1/16 oz.; anhydrous powdered copper sufate, ⅜ oz.; magnesium glycerophosphate, 3⅓ oz.; dried iron sulfate, 4⅖ oz.; dried magnesium sulfate, 5⅞ oz.; soluble saccharin, 1 lb. 5⅔ oz.; vanillin, 1 lb. 11⅛ oz.; citrus pectin, 2 lb. 1⅞ oz.; monobasic calcium phosphate, anhydrous, 15 lbs. 3⅓ oz.; cocoa powder, bolted, 18 lbs. 4 oz.; and anhydrous dicalcium phosphate, 2 lbs. 10⅔ oz. The mixture is triturated for 2 hours and then 33 lbs. 14 oz. of powdered sugar are added. The whole is triturated for one hour longer and is then added to a mixture of 423 lbs. of purified liver protein, 4 lbs. 4 oz. of oil of lemon, 16 lbs. 15 oz. of light paraffin oil and 16 lbs. 15 oz. of glycerin in a suitable mixing container. Thereafter, and while the stirring device is in operation, 74 lbs. 8 oz. of skimmed milk powder, 100 lbs. of bolted cocoa powder and 116 lbs. 6 oz. of a commercially available mixture of dextrose, maltose and dextrins are added. The ingredients are thoroughly mixed and then compressed into slugs on a slugging machine. The compressed material is put through a No. 10 screen, which converts it to a granular state suitable for ingestion as such or for use mixed with other foods.

Example 2

Example 1 is repeated, save that instead of using pepsin I use the pyloric caecal mass of tuna to supply the enzyme. This material, obtained as a frozen mass, is ground in the frozen state, and the ground material, after thawing, is used directly. With 600 pounds of wet liver residue, about 100 pounds of wet pycloric caecal mass is used. The product obtained in thus repeating Example 1 is obtained in substantially the same state and yield as in Example 1.

Example 3

Example 2 is repeated, save that instead of using whole pyloric caecal mass I use a dry enzymatic product prepared from pyloric caecal mass. The dry enzyme is used in an amount equal to about 2.0 percent (dry weight) of liver residue. The product is obtained in substantially the same desirable state and yield as in Example 1.

Example 4

The preceding examples are repeated, save that instead of using liver residue I use fish protein material.

Fish cuttings—wholesome portions of tuna left as scrap in the selection of choice portions for canning—are frozen, and the mass is ground in the frozen state. The ground material is now desirably dispersed in aqueous alkaline solution containing about 2.5 volumes of water to each volume of ground fish material and about 1.6 pounds of sodium hydroxide to each 100 pounds of fish material; and the mixture is rapidly heated to about 75° C. while being stirred. This produces a finely divided suspension of protein, without causing hydrolysis or racemization thereof. From this suspension the undispersed material is separated as by screening or centrifuging, and the protein is then precipitated with hydrochloric acid. The precipitated protein is recovered, and thoroughly washed with water, and then desirably is extracted with a fat solvent such as acetone. This leaves a considerably purified protein curd, which is substantially freed of certain circulatory depressant and toxic substances, including choline.

This purified protein curd, while free of fat and of choline and certain other undesirable contaminants, is nevertheless itself unsuitable as a dietary supplement, for even when dried it has a distinctly unpalatable taste and odor.

This protein curd is subjected to my purification process in place of the liver residue used in the preceding examples, and yields a tasteless and odorless material suitable as a dietary supplement of high nutritive value and small bulk.

*Example 5*

To a mixture of 500 g. of defatted pork pancreas residue from the manufacture of insulin (or of wet liver residue), in about 3250 cc. of water, there is added about 0.170 g. of pepsin (1:6000) dissolved in a small quantity of warm water, the mixture is thoroughly stirred, and allowed to digest overnight (12-15 hours) at about 20°-25° C. and at the existing pH (about 5.0). The supernatant liquid is then decanted and discarded, and the solids are suspended in distilled water and then allowed to settle. The solids are again recovered and again suspended in water, and are separated by centrifugation, washed with additional water, and recovered.

For use as such, the solid product may be recovered by washing with a water-dissolving organic solvent such as alcohol or acetone, and the solvent and any residual water removed by evaporation. The solid product may be used as an intermediate, and in such case it need not be recovered in dry state. The purified protein may be used, for example, as the starting material for the preparation of amino acid products. One way of doing this is as follows:

The solid product recovered from the centrifuge, weighing about 436.5 g., is mixed with about 1000 g. of ground, frozen, fresh, tuna pyloric caecal mass, about 200 cc. of distilled water, and about 40 cc. of chloroform: the mixture is adjusted to pH 8.2 with solid calcium hydroxide; and sufficient toluol is added to cover the surface. The mixture is digested at about 42°-45° C. with intermittent agitation. After about 24 hours the mixture is adjusted to about pH 7.9, with calcium hydroxide. Digestion is complete in about 96 hours, when the mixture is heated to 85°-90° C. for about half an hour to terminate the enzyme action, and then cooled. The cool mixture is adjusted to about pH 6.5 with sulfuric acid and then filtered, using filter aid. The solids are washed with several portions of distilled water, which are added to the filtrate.

The filtrate, comprising essentially a solution of amino acids, may be further purified. For example, the filtrate, amounting to about 1800 cc., is heated, and to the hot filtrate is added a hot mixture of 105 g. of yellow lead oxide, 52 g. of calcium hydroxide, and 100 cc. of water. The resulting mixture is filtered while hot, and the filtrate is saturated with hydrogen sulfide gas, then adjusted to about pH 6.5 and again filtered.

To this filtrate (or to the original filtrate obtained directly from the digestion mixture) are added about 143 g. of acid-treated artificial inorganic zeolite in pulverized state, and suspension is maintained with stirring for about 13 minutes, then 30 g. of decolorizing carbon are added, and after stirring for about 2 minutes longer the mixture is promptly filtered. The filtrate, which comprises a purified solution of amino acids, is dried, as by spray drying, and yields a powder containing about 13.5 percent amino nitrogen and consisting mainly of purified amino acids. Such amino acid powder provides a beneficial dietary supplement free from distasteful and nauseating by-products ordinarily present in protein digestion products.

I claim:

1. In the process for the preparation of a dietary supplement from a crude protein material containing choline and like impurities, the steps which comprise digesting said protein source with a proteolytic enzyme under conditions of low-grade enzyme activity, terminating the digestion when substantially all the choline and not more than about 10 percent of the protein has been rendered soluble, and washing the digested protein with water and a fat solvent.

2. The process as claimed in claim 1, in which the fat solvent is ethanol.

3. The process of purifying a crude choline-containing protein material which comprises digesting said material with a proteolytic enzyme under condition of low-grade enzyme activity until about 80 percent of the choline contained therein has been rendered soluble, and washing the digested protein with water and a fat solvent.

4. In the process of purifying a crude choline-containing protein material by proteolytic digestion under suboptimal conditions for enzymatic activity, the step which comprises digesting until about 80 percent of the choline content of the material has been rendered soluble.

5. In the process of purifying a crude choline-containing protein material by proteolytic digestion under suboptimal conditions for enzymatic activity, the improvement which comprises determining the insoluble choline content of the protein, digesting the protein under suboptimal conditions until about 80 percent of the choline content of the protein has been rendered soluble, terminating the digestion, and washing solubilized substances out of the protein.

6. The process of purifying a crude choline-containing protein material which comprises subjecting the crude material in aqueous mixture to partial digestion with a suboptimal amount of a proteolytic enzyme under suboptimal conditions of enzymatic activity for the enzyme present, for a period of time sufficient to solubilize substantially all of the choline, terminating the digestion, and removing soluble contaminants from the insoluble portion of the digestion mixture.

ARCHIE LEE CALDWELL.

REFERENCES CITED

The following references are of record in the file of this patent:

UNITED STATES PATENTS

| Number | Name | Date |
|---|---|---|
| 2,364,008 | Stuart | Nov. 28, 1944 |
| 2,380,847 | Kaufman | July 31, 1945 |
| 2,436,239 | Weisberg et al. | Feb. 17, 1948 |